Figure 4:
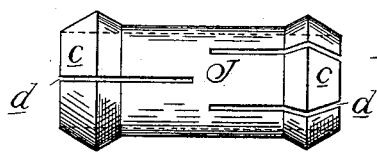

No. 627,946. Patented June 27, 1899.
M. L. WILCOX.
CRANK SHAFT AND BEARING FOR CYCLES.
(Application filed May 8, 1897.)
(No Model.) 2 Sheets—Sheet 1.
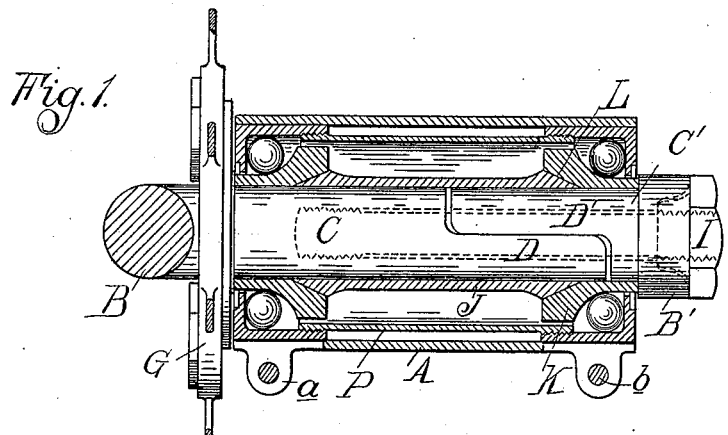
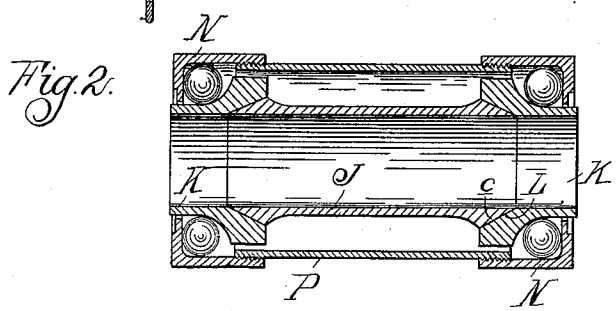
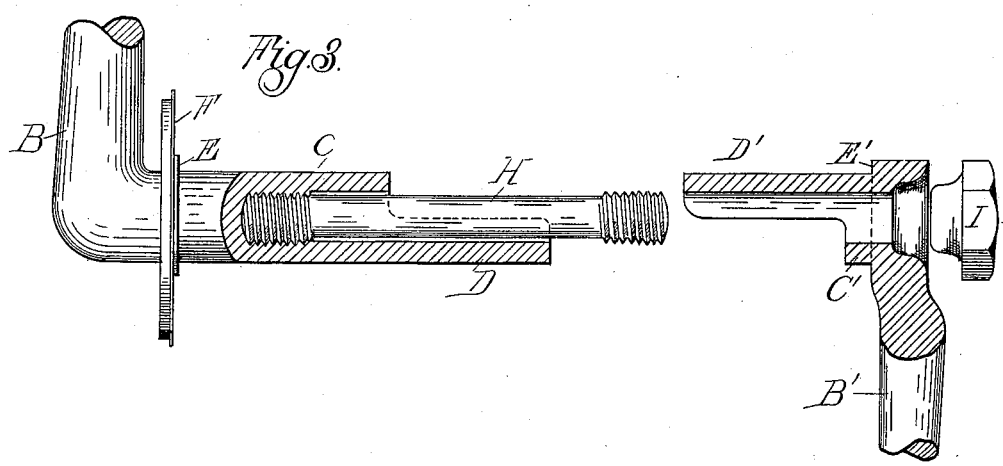
Inventor:
Melvin L. Wilcox,
By
Attorneys.
Witnesses:

No. 627,946. Patented June 27, 1899.
M. L. WILCOX.
CRANK SHAFT AND BEARING FOR CYCLES.
(Application filed May 8, 1897.)
(No Model.) 2 Sheets—Sheet 2.

Witnesses: Inventor:
Melvin L. Wilcox,
By Attorneys.

UNITED STATES PATENT OFFICE.

MELVIN L. WILCOX, OF BAY CITY, MICHIGAN, ASSIGNOR TO THE NATIONAL CYCLE MANUFACTURING COMPANY, OF SAME PLACE.

CRANK-SHAFT AND BEARING FOR CYCLES.

SPECIFICATION forming part of Letters Patent No. 627,946, dated June 27, 1899.

Application filed May 8, 1897. Serial No. 635,617. (No model.)

*To all whom it may concern:*

Be it known that I, MELVIN L. WILCOX, a citizen of the United States, residing at Bay City, in the county of Bay and State of Michigan, have invented certain new and useful Improvements in Crank-Shafts and Bearings for Cycles, of which the following is a specification, reference being had therein to the accompanying drawings.

This invention relates to that class of bearings in which the shaft is removable without affecting the integrity of the bearing; and the invention consists in the peculiar construction of an interior sleeve in the bearing, whereby the same is adapted to clamp the shaft of the bearing.

It further consists in the novel construction and arrangement of a divided crank-shaft, whereby it forms a perfect lock and union with the bearing and can be removed without interference with the bearing.

The invention also consists in the specific construction, arrangement, and combination of different parts whereby the above-described objects are obtained in a manner which embodies all the features desirable in such bearings—such as having all the parts interchangeable or respectively reversible, capable of perfect adjustment, and easy to mount or dismount for cleaning or repair—all as more fully hereinafter described and shown in the drawings, in which—

Figures 5, 6:
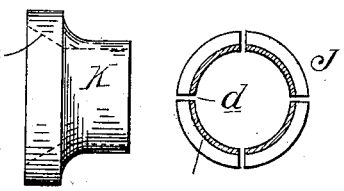
Figure 7:
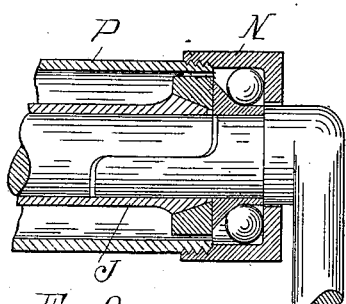
Figure 8:
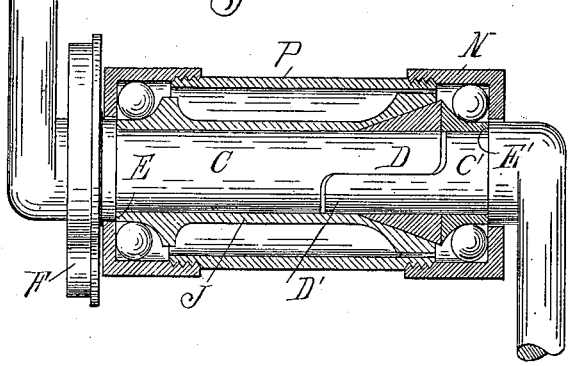
Figure 9:
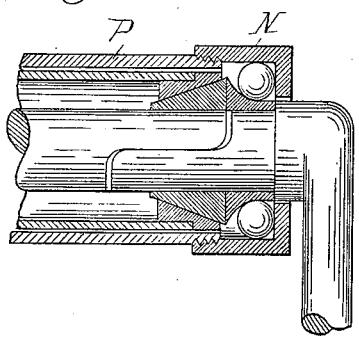

Figure 1 is a section of a bearing in a plane with its axis and in connection with the crank-hanger and a crank-shaft of my construction. Fig. 2 is a section of the same bearing in its integrity after detaching it from the hanger and from the crank-shaft. Fig. 3 shows the parts of the crank-axle detached. Fig. 4 is a detached elevation of the clamping-sleeve shown in Fig. 2. Fig. 5 is a detached elevation of one of the clamping-cones. Fig. 6 is a cross-section through the split end of the clamping-sleeve. Figs. 7, 8, and 9 are sections of modified forms of construction hereinafter specifically referred to.

Referring to Figs. 1 to 6, A is the crank-hanger, formed with split ends having clamping-lugs $a$ and screws $b$.

B B' are respectively the right and left cranks.

C and C' are the divided sections of the crank-shaft, formed with overlapping ends D D', which are semicircular in cross-section. These divided sections are formed, preferably, integral with the crank to which they are connected and are preferably of unequal length, that carrying the sprocket being the longer, as shown.

E E' are shoulders formed at the outer ends of the crank-axle or sections thereof.

F is a disk on the crank-section C.

G is the sprocket-wheel, secured to the disk.

H is a connecting-bolt firmly secured at one end in the section C and adapted to project freely with its free end through a central aperture in the section C'.

I is a securing-nut adapted to engage with the screw-threaded end of the bolt H in assembling the parts of the shaft together.

J is a slitted clamping-sleeve fitting the crank-shaft and formed with wedge-shaped ends $c$. The slits $d$, as preferably constructed, extend from the opposite ends to the middle or near the middle, the slits on one side being intermediate to the slits on the other half, or it may have one or more slits from end to end.

K are clamping cones or collars adapted to fit the crank-shaft and provided upon their inner ends with wedge-shaped recesses L, adapted to receive the wedge-shaped ends of the clamping-sleeve. These clamping-cones form the inner bearings for the balls, and their outer ends form abutments for the shoulders E E' on the sections of the crank-shaft.

N are ball-cups whose end flanges form outer bearings for the balls. These flanges have central orifices, through which the ends of the clamping cones or collars project outwardly.

P is a coupling-sleeve of slightly smaller diameter than the cups. It is exteriorly screw-threaded upon its ends and engages with corresponding interior threads formed in the inner ends of the cups.

The parts in their assembled condition, as shown in Fig. 1, operate as follows: The screw-threaded nut I being firmly screwed home on the connecting-bolt H draws the two sections of the crank-shaft together, so that their shoulders E E' are brought against the outer ends of the clamping-cones, thereby forcing the latter endwise upon the wedge-shaped ends of the clamping-sleeve and causing the latter to firmly bind upon and clamp the shaft-sections C C' together. The sections having interlocking ends inclosed within the clamping-sleeve and being firmly clamped together for their whole length are therefore united very rigidly, and the shaft is thereby strengthened to the amount of friction caused by said clamping. Therefore the joint is compensated for by the strength of the clamping-sleeve, which being clamped its whole length virtually becomes a part of the shaft, and thus makes the joint very rigid.

In this connection I call attention to the location of the joint, which by reason of the unequal length of the shaft-section is thereby brought directly within the clamping-section of one end of the clamping-sleeve, while the other end of the clamping-sleeve is clamped upon the solid portion of the shaft-section which transmits the power directly to the sprocket-wheel. I do not, however, confine myself to this particular construction, as I fully appreciate the fact that the joint may be located otherwise.

It will further be seen that my construction of crank-shaft not only unites and binds the sections of the shaft firmly together, but also prevents any lost motion of the same in the bearing, because the clamping-sleeve being firmly wedged upon the shaft by the clamping-cones becomes practically a solid portion of the shaft, and the action of the balls themselves will tend to keep the cones wedged upon the clamping-sleeve, which in turn clamps the shaft.

In my construction the adjustment of the ball-bearings is independent of the adjustment of the crank, and thus if the binding-screws of the crank-hanger are properly loosened the whole crank-shaft and bearing can be adjusted laterally within the hanger, while, on the other hand, each ball-bearing can be independently adjusted by screwing the cups in or out, the cups having suitable spanner-holes for the purpose. However, by reason of the barrel P connecting the cups the adjustment of the cup on the left side of the crank-axle accomplishes the adjustment of both ball-bearings. To dismount the crank-shaft, the clamping-nut I is unscrewed, which permits either or both sections to be laterally withdrawn, and if either or both are withdrawn the bearing remains intact within the hanger. If both crank-shaft sections are withdrawn and the binding-screws of the hanger are loosened, the bearing as a whole can be removed intact from the hanger, thus making it very convenient to take it apart, clean it or examine it, and put it together again apart from the wheel, or for the purpose of rapid cleaning it need not even be taken apart, but simply be dropped into a small can of gasoline and shaken to remove the oil and dirt. My construction thus affords better facilities for taking care of the ball-bearings of a wheel, and it especially removes the difficulties of taking the crank-bearings apart and putting them in place again.

My improved bearing while thus embracing all the desirable features is yet very simple, there being but three parts in the whole construction where screw-thread engagements are made, while at the same time the bearing is not only reversible as a whole, but interchangeable or reversible as regards the component parts, which makes it easily manipulated by inexperienced persons.

My bearing is a complete and operative article of manufacture in itself. It can be fastened upon any shaft simply by applying end pressure against the outer ends of the inner sleeve, and it likewise can be applied to any wheel by securing it in any suitable manner within the hub of the wheel.

The spirit of my invention includes the modifications shown in Figs. 7, 8, and 9, in which Fig. 7 shows the cones made in two parts, the inner part being made of soft steel, so as not to be easily broken in forcing it onto the sleeve. In Fig. 8 there is a sleeve without the slits, and one cone is formed integral therewith. The other cone is split and is the part which clamps the divided sections of the shaft together by being forced into a wedge-shaped recess in the end of the sleeve. This cone may be made all in one piece or in two pieces, as shown. In Fig. 9 the construction is the same, except that the sleeve is of larger diameter than the shaft and reinforced at the end in a manner to form a wedge-shaped recess for the clamping-cones.

What I claim as my invention is—

1. In a ball-bearing of the character described, an interior bearing constituting a sleeve for the shaft or spindle, composed of two or more sections formed with wedge-joints between them adapted to clamp the shaft by endwise compression of the sleeve, and a shaft provided with shoulders one movable relative to the other adapted to clamp said sleeve between them.

2. In a ball-bearing the combination of a crank-shaft, the outer casing or box provided in its opposite ends with outside bearings for the balls adjustable from and toward each other, an interior sleeve adapted to removably receive the crank-shaft so that the latter can be removed and replaced without disturbing the relation of the sleeve to the bearing and provided near its outer ends with cone-bearings forming the inside bearings for the balls, balls, said sleeve being formed intermediate its cone-bearings with a wedge-joint, and means independent of the outside bearings for moving the parts of said wedge-joint to clamp the sleeve onto the shaft.

3. In a crank-shaft and bearing for velocipedes, a divided crank-shaft comprising two sections formed with overlapping end portions constituting a lap-joint, an interior sleeve in the bearing on the shaft having contractible sections, one half of said sleeve extending over and clamping the shaft at a point opposite the lap-joint of the shaft-sections and the other half clamping on the adjacent solid portion of one shaft-section, and means acting on the sleeve to cause said contractible sections to clamp onto the shaft-sections as specified.

4. The combination of a crank-shaft provided with fixed shoulders at the ends and divided into two sections between said shoulders, a ball-bearing having an interior clamping-sleeve adapted to receive said shaft, a clamping-collar adapted to engage said sleeve and to be moved by said shoulders on the shaft to bind the sleeve and shaft firmly together, and means for moving the shoulders toward each other to produce the clamping action, substantially as described.

5. In a bicycle ball-bearing, the combination of an inner sleeve in said bearing composed of two cone-bearing collars forming the inner bearings for the balls and a clamping-sleeve slitted at its opposite ends and wedged into the adjacent inner ends of the cone-collars, a crank-shaft in two sections each provided with a shoulder and a clamping-bolt for drawing the sections endwise together.

6. In a crank-hanger bearing the combination with a hanger-box, of a ball-bearing unit detachably secured within said hanger-box and comprising an outer casing and an interior sleeve respectively, provided with outside and inside bearings forming ball-races in the opposite ends of the said bearing, said interior sleeve being composed of different members conjointly supported in the bearing independently of the shaft, and formed with one or more wedge-clamping joints between suitable members of said sleeve to form a coupling for a divided crank-shaft, and a divided crank-shaft formed with shoulders on the outer ends and a clamping-bolt extending axially from one section to the other for drawing them together to clamp the sleeve endwise between them.

In testimony whereof I affix my signature in presence of two witnesses.

MELVIN L. WILCOX.

Witnesses:
GUY E. MARSH,
WILL E. DAVIDSON.